United States Patent [19]

Noll

[11] Patent Number: 4,906,197

[45] Date of Patent: Mar. 6, 1990

[54] SPRING ENGAGEMENT MECHANISM FOR MATING ELECTRICAL AND FIBER OPTIC CONNECTORS INDEPENDENTLY

[75] Inventor: Gregory B. Noll, Corona, Calif.

[73] Assignee: Hughes Aircraft Company, Los Angeles, Calif.

[21] Appl. No.: 342,205

[22] Filed: Apr. 21, 1989

[51] Int. Cl.⁴ .............................................. H01R 23/68
[52] U.S. Cl. ..................................... 439/79; 350/96.21; 439/248; 439/364; 439/924
[58] Field of Search ................................... 439/59–62, 439/64, 79, 80, 924, 246–252, 362–365; 350/96.20, 96.21

[56] References Cited

U.S. PATENT DOCUMENTS

| 2,891,231 | 6/1959  | Gregson et al. | 439/384   |
|-----------|---------|----------------|-----------|
| 2,919,317 | 12/1959 | Mercer et al.  | 200/51.12 |
| 3,209,302 | 9/1965  | Uberbacher     | 439/153   |
| 3,431,428 | 3/1969  | Van Valer      | 307/10    |
| 3,432,795 | 3/1969  | Jayne          | 439/924   |
| 3,915,307 | 10/1975 | Agarde         | 211/41    |
| 4,133,022 | 1/1979  | Moore et al.   | 361/413   |
| 4,412,712 | 11/1983 | Reimer et al.  | 439/64    |
| 4,432,604 | 2/1984  | Schwab         | 350/96.20 |
| 4,470,100 | 9/1984  | Rebaudo et al. | 439/64    |
| 4,483,178 | 11/1984 | Miille         | 73/1 R    |
| 4,550,362 | 10/1985 | Reimer         | 361/415   |
| 4,579,406 | 4/1986  | Laursen et al. | 361/409   |
| 4,597,631 | 7/1986  | Flores         | 350/96.21 |
| 4,767,181 | 8/1988  | McEowen        | 350/96.21 |
| 4,772,081 | 9/1988  | Borgos et al.  | 350/96.21 |

Primary Examiner—Neil Abrams
Attorney, Agent, or Firm—Joseph E. Szabo; Terje Gudmestad; Wanda K. Denson-Low

[57] ABSTRACT

An apparatus (11) comprising a mother board (13), a daughter board (15), an electrical connector pair (17) and an optical connector pair (19). The connector pair (17) includes electrical connectors (23, 27) mounted, respectively, on the mother board (13) and the daughter board (15), and the optical connector pair (19) includes connectors (31, 33) mounted, respectively, on the mother board (13) and the daughter board (15). The optical connector (31) is mounted on the mother board (13) for movement toward and away from the optical connector (33). The daughter board (15) can be moved toward the mother board (13) to mate the electrical connectors (23, 27). Subsequently, a screw (21) is rotated to move the optical connector (31) into mating relationship with the optical connector (33).

9 Claims, 3 Drawing Sheets

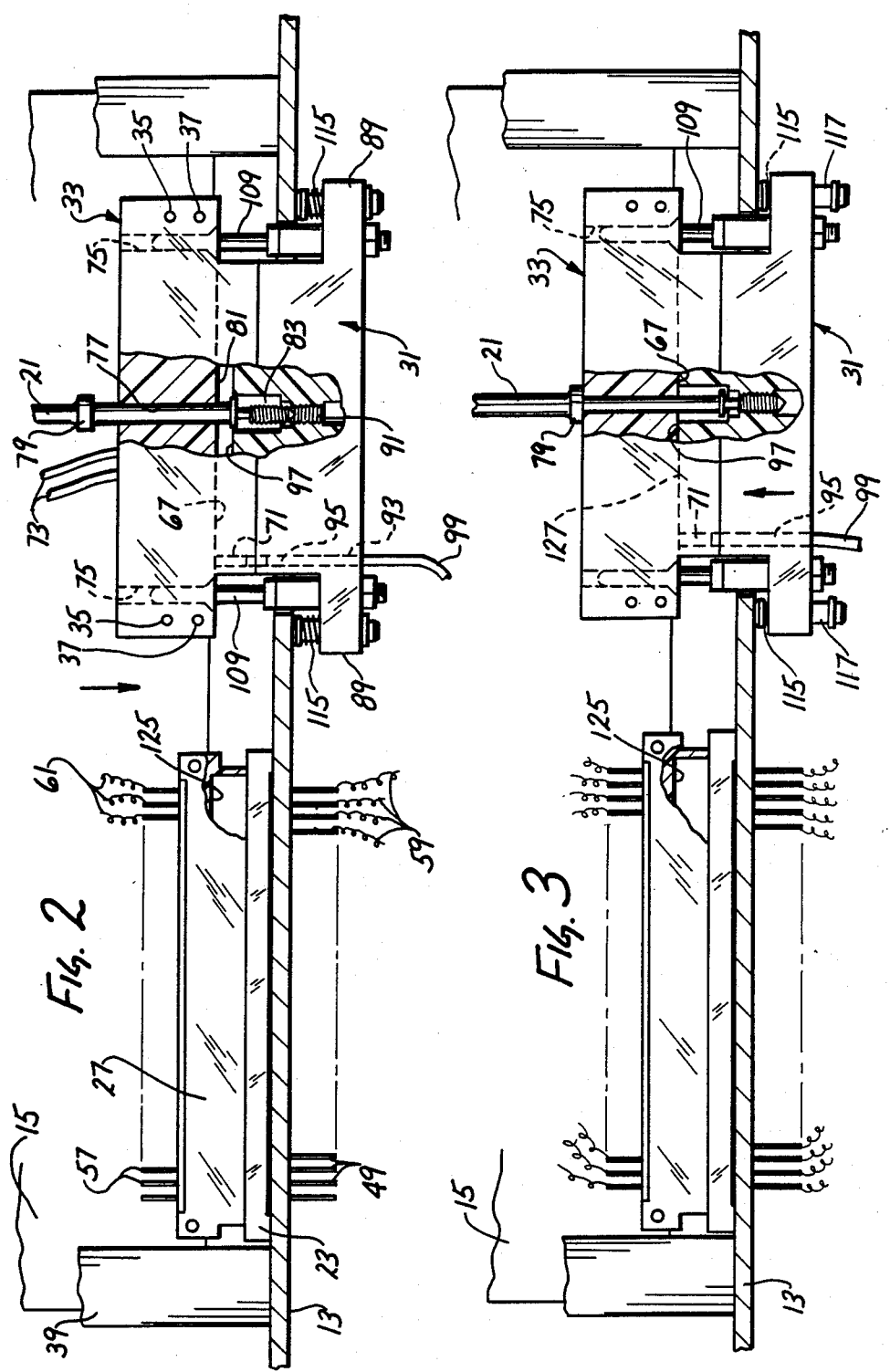

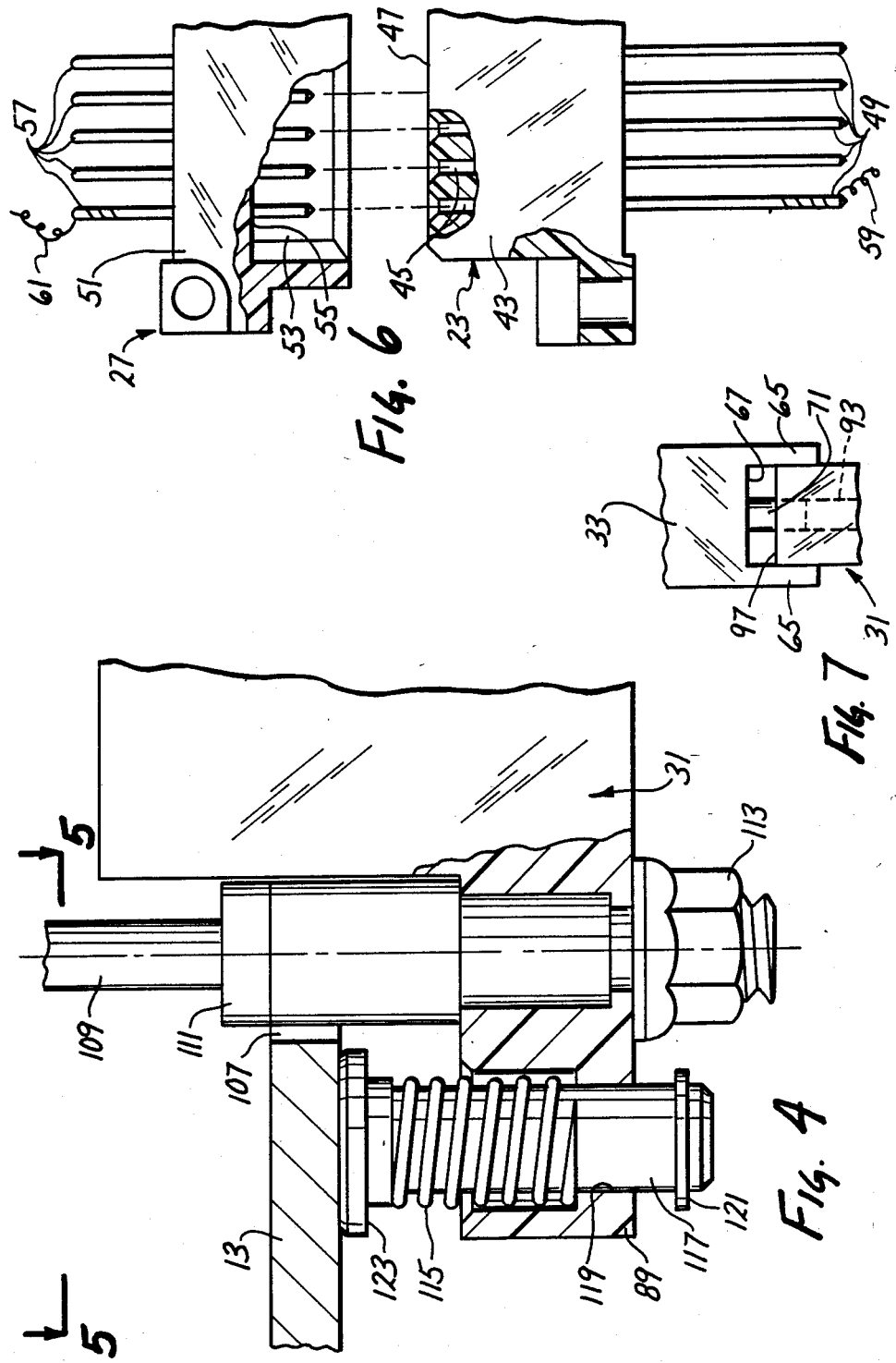

4,906,197

SPRING ENGAGEMENT MECHANISM FOR MATING ELECTRICAL AND FIBER OPTIC CONNECTORS INDEPENDENTLY

BACKGROUND OF THE INVENTION

1. Field of the Invention

This invention relates to the mating of the connectors of at least two connector pairs and in particular to the mating of the connectors of two different kinds of connector pairs.

2. Description of Related Art

A conventional electrical connector pair comprises a plug connector and a receptacle connector which can be operatively engaged to operatively couple the signal-transmitting elements or leads coupled to the connectors. It is common practice to mount one of the connectors on a mother board and the other of the connectors on a daughter board. The connectors can be mated or operatively connected by advancing the daughter board toward the mother board to bring the connectors into operative engagement.

Multiple electrical connector pairs can be operatively connected in the same fashion by providing multiple electrical connectors on the mother board and the daughter board. Thus, a single daughter board can be used to mate two or more electrical connector pairs. This can be accomplished with relative ease because the electrical connector pairs, being like connectors, can be constructed and assembled to essentially the same tolerances and arranged to mate along a common plane.

Problems arise in attempting to use the technique described above to mate dissimilar connector pairs, such as electrical and optical connector pairs. One reason for this is that optical connectors must be constructed, assembled and mated with much tighter tolerances than electrical connectors in order to minimize optical losses. In addition, it is difficult or impossible to have the optical connectors mate along the same plane as the electrical connectors. Although mating of electrical and optical connectors can be accomplished using very tight tolerances, this is difficult and costly to achieve.

SUMMARY OF THE INVENTION

This invention solves these problems by providing an apparatus and method which accomplish operative engagement of the electrical and optical connectors without the need for the tight tolerances required previously. This can be advantageously accomplished by utilizing an apparatus which enables operative engagement of the electrical connectors first and subsequent operative engagement of the optical connectors. Because the electrical and optical connectors are independently operatively engaged, each can be constructed and assembled to its own tolerance requirements, and each of the connectors can be mated along different planes.

Although the discussion herein is with respect to electrical and optical connectors, it should be understood that this is merely the preferred example of the kinds of connectors to which this invention is applicable. The invention is particularly applicable to dissimilar connector pairs of which electrical and optical connector pairs are a prime example. However, the invention is equally applicable to an optical connector pair with any other kind of connector pair, including electrical, optical, pneumatic or hydraulic.

In order to permit the optical connectors to be mated after mating of the electrical connectors, one of the optical connectors is mounted on a support member, such as the mother board, for movement relative to its support member along a path toward and away from the other optical connector. Accordingly, after the electrical connector pair is mated, this optical connector can be moved toward the associated optical connector into operative engagement with the other optical connector.

To more firmly mount the movable optical connector, biasing means is preferably employed for urging the movable connector along the path away from the associated optical connector. Movement of the movable optical connector along the path against the force of the biasing means into operative engagement with the other optical connector can advantageously be accomplished with a screw rotatably carried by the support member, such as the daughter board, to which the other optical connector is mounted.

The invention, together with additional features and advantages thereof, may best be understood by reference to the following description taken in connection with the accompanying illustrative drawing.

BRIEF DESCRIPTION OF THE DRAWING

In the accompanying drawings:

FIG. 2 is a fragmentary, elevational view partially in section with the electrical connectors mated and with the optical connectors unmated.

FIG. 3 is a view similar to FIG. 2 with both of the connector pairs mated.

FIG. 4 is an enlarged fragmentary, sectional view illustrating a preferred way of movably mounting one of the optical connectors on the mother board.

FIG. 6 is a fragmentary, elevational view partially in section of one kind of electrical connector pair that can be used with the present invention.

FIG. 7 is a fragmentary end elevational view of the optical connector pair in the position of FIG. 2.

DESCRIPTION OF THE PREFERRED EMBODIMENT

Figure 1:
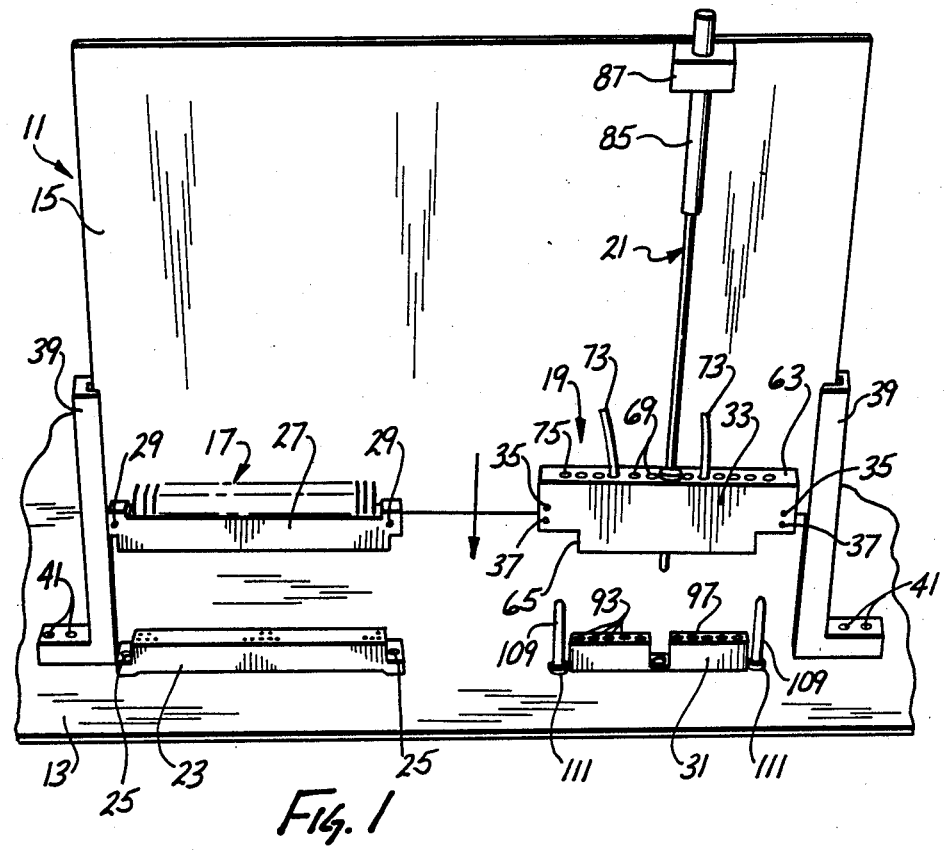
FIG. 1 is a fragmentary, isometric view illustrating a daughter board, a portion of a mother board and two dissimilar connector pairs, with the connectors being out of operative engagement.

Referring now to the drawings in more detail, FIG. 1 shows an apparatus 11 which comprises a support member in the form of a mother board 13, another support member in the form of a daughter board 15, an electrical connector pair 17, an optical connector pair 19 and a screw 21 carried by the daughter board 15. The electrical connector pair 17 comprises a socket electrical connector 23 suitably fixedly attached to the mother board 13 by fasteners 25 and a pin electrical connector fixedly suitably attached to the daughter board 15 as by fasteners 29. The optical connector pair 19 comprises a receptacle connector 31 coupled to the mother board 13 as described hereinbelow, a plug optical connector 33 and fasteners 35 for fixedly mounting the plug optical connector 33 on the daughter board 15. The fasteners 35 may be in the form of screws, and dowels 37 may be employed to provide precise positioning of the optical connector 33 on the daughter board 15.

The daughter board 15 may be mounted for movement toward and away from the mother board 13 in any suitable manner. For example, this may be accomplished by a pair of channels 39 attached to the mother board 13 by screws 41. With this arrangement, the channels 39 can receive opposite edge portions of the daughter board 15 to provide for movement of the daughter board 15 toward and away from the mother board 13 along a path extending perpendicular to the mother board.

The electrical connector 17 may be conventional, and in the embodiment illustrated, the electrical connectors 23 and 27 are conventional Mil-C-55302/131 and 132 connectors. Because the electrical connectors are conventional, they are not illustrated or described in detail herein. However, as shown in FIG. 6, the connector 23 comprises a connector body 43 of electrical insulating material having a plurality of upwardly facing sockets 45 opening along an upper or mating surface 47 and a plurality of pins 49 fixedly retained in the lower ends of the sockets 45. The pin connector 27 comprises a body 51 of electrical insulating material having a recess 53 with an end or mating surface 55 and a plurality of pins 57 extending through the body 51 and into the recess 53.

The electrical connectors 23 and 27 in the position of FIG. 6 are unmated. To mate the connectors 23 and 27, the connectors are relatively advanced toward each other to place a region of the socket connector 23 into the recess 53 to thereby advance the pins 57 into the sockets 45 and into electrically coupled relationship with the pins 49. With the connectors 23 and 27 properly mated, the surfaces 47 and 55 are in engagement. Of course, each of the pins 49 and 57 is typically coupled to elongated electrical signal-transmitting elements, such as wires 59 and 61, which can be wrapped around and suitably coupled to the pins 49 and 57. Only a few of the wires 59 and 61 are shown in FIG. 6.

The plug optical connector 33 may also be conventional. As such, it includes a body 63 (FIGS. 1-3 and 7) having spaced parallel flanges 65 extending downwardly from a mating surface 67 and a plurality of passages 69 (FIG. 1) extending through the body. Conventional optical pin termini 71 are mounted in the passages 69, respectively, in a known manner and project below the mating surface 67 into the region between the flanges 65 as shown in FIG. 7. Elongated optical signal transmitting elements in the form of optical fibers 73 (FIG. 1) extend into each of the passages 69, respectively, and are optically coupled to the pin termini 71 in a conventional manner. Only a few of the optical fibers 73 are illustrated. The plug optical connector 33 also has guide passages 75 adjacent its opposite ends and a central bore 77 for slidably receiving the screw 21. The guide passages 75 are flared conically outwardly at the lower ends as shown in FIGS. 2 and 3.

The screw 21 is slidable in the bore 77 between annular shoulders 79 and 81 on the screw. The screw 21 has a lower threaded portion 83 and a handle portion 85 rotatably received within a mounting block 87 (FIG. 1) suitably mounted on the daughter board 15. In this fashion, the screw 21 is carried by the daughter board 15.

The receptacle optical connector 31 has flanges 89 at its opposite ends, a threaded central bore 91 and a plurality of passages 93 (only one being shown in FIGS. 2 and 3) each containing an optical socket terminus 95 of conventional construction. The passages 93 open at a planar mating surface 97. Optical fibers 99 (only one being shown in FIGS. 2 and 3) extend into each of the passages 93 and are suitably optically coupled to the socket terminus 95 in such passage in a conventional manner. As such, the receptacle optical connector 31 may be of essentially conventional construction.

Figure 5:
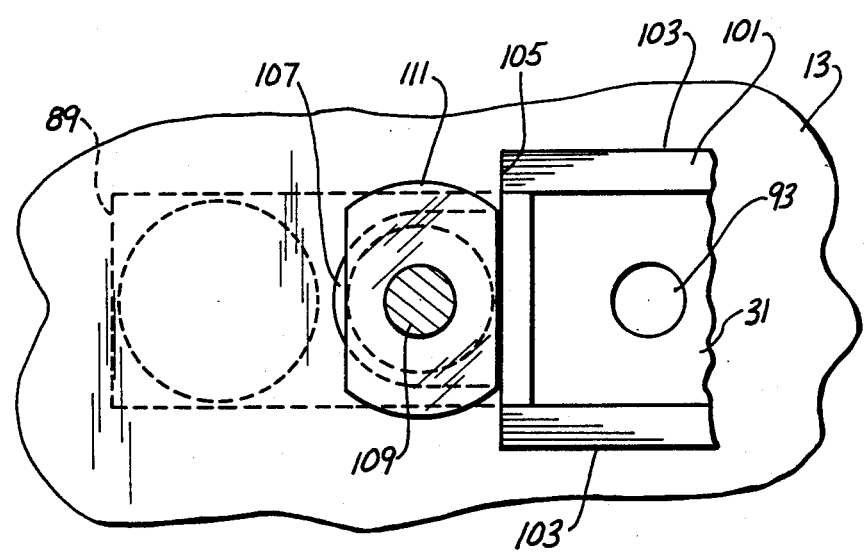
FIG. 5 is a fragmentary view taken generally along 5—5 of FIG. 4.

A structural feature of the invention is the manner in which the receptacle optical connector 31 is mounted on the mother board 13 for movement relative to the mother board along a path toward and away from the optical connector 33. To accomplish this, the mother board 13 has an oversized opening 101 (FIG. 5) with longitudinal edges 103 and opposite end edges 105 (only one being shown in FIG. 5) and end slots 107 at the opposite ends of the opening 101 (only one being shown in FIG. 5). The receptacle optical connector 31 projects into the opening 101 and is spaced from the edges 103 and 105 of the opening as shown in FIG. 5 to allow relative movement between the optical connector 31 and the mother board 13 in the plane of the mother board in a known manner. This also allows relative movement between the optical connector 31 and the mother board 13 in a direction along a path toward and away from the optical connector 33. Guide pins 109 are mounted on the flanges 89, respectively, and project upwardly through the end slots 107, respectively. The guide pins 109 project through the associated end slots 107 with an appropriate clearance so as to allow the above-mentioned relative movement between the optical connector 31 and the mother board 13. A collar 111 is mounted on each of the guide pins 109, and the collars have a dimension wider than the dimension of the associated end slot 107 so that the collars can rest on the top of the mother board 13 at the slots 107. The guide pins 109 extend through the flange 89, and a nut 113 prevents the guide pins from being withdrawn upwardly out of the associated flange.

Coil compression springs 115 are supported by shafts 117, respectively, and urge the optical connector 31 along a path away from the optical connector 33. The shafts 117 extend through openings 119 (FIG. 4) of the flanges 89 with a sliding fit and are retained therein by a retainer 121 at the lower end of the shaft and a shoulder 123 at the upper end of the shaft. The spring 115 acts between the shoulder 123 and the flanges 89 to bias the connector 31 downwardly as viewed in FIG. 4.

With the connector pairs 17 and 19 mounted on the mother board 13 and the daughter board 15 as shown in FIG. 1, the daughter board can be advanced toward the mother board as guided by the channels 39 to operatively engage or mate the electrical connectors 23 and 27 as shown in FIG. 2. Of course, all that is required is relative movement between the board 13 and 15, and so either or both of the boards may be moved to bring about mating of the electrical connectors 23 and 27. When the electrical connectors 23 and 27 are mated, the surfaces 47 and 55 are in engagement along a mating plane 125 (FIGS. 2 and 3).

As the daughter board 15 is moved toward the mother board 13 and prior to the mating of the electrical connectors 23 and 27, the upper ends of the guide pins 109 enter the guide passages 75, respectively, and the screw 21 enters the bore 91. The upper ends of guide pins 109 are rounded, and they cooperate with the conical lower ends of the guide passages 75 to accurately guide the pins into the passages. Any misalignment of the pins 109 with the associated passages 75 is accommodated by the conical portions of the passages 75 camming the guide pins 109 and the receptacle optical connector 31 in the plane of, and relative to, the mother board 13 to bring about accurate alignment between the optical connectors 31 and 33 and more particularly, proper axial alignment among the pin termini 71 and the socket termini 95. With the daughter board 15 in the position of FIG. 2, the screw 21 rests on the threaded portion of the bore 91, and the upper end of the optical connector 31 is received between the flanges 65.

To mate or operatively engage the optical connectors 31 and 33, the screw 21 is rotated to cooperate with the threaded portion of the bore 91 to draw the optical connector 31 upwardly relative to the mother board 13 and along the path defined by the guide passages 75 and the guide pins 109. This motion of the optical connector 31 along the path is perpendicular to the mother board 13 and against the biasing action of the springs 115. Ultimately a mating or optically coupled position is reached in which the matinq surfaces 67 and 97 are in engagement (FIG. 3). In this position, the pin termini 71 are properly seated within the socket termini 95, respectively, to establish proper optical coupling between the optical fibers 73 and 99. The mating surfaces 67 and 97 mate along a mating plane 127 which, in this embodiment, is slightly below the mating plane 125 of the electrical connectors 23 and 27. In this manner, the optical connectors 31 and 33 are mated after the electrical connectors 23 and 27 are mated, and this mating occurs along different planes.

Although an exemplary embodiment of the invention has been shown and described, many changes, modifications and substitutions may be made by one having ordinary skill in the art without necessarily departing from the spirit and scope of this invention.

What is claimed is:

1. An apparatus for operatively coupling signal-transmitting elements, said apparatus comprising:
   (a) first and second support members;
   (b) first and second connector pairs adapted to be coupled to the signal-transmitting elements, each of said first and second connector pairs including first and second connectors which can be operatively engaged to couple the signal-transmitting elements;
   (c) said second connector pair being an optical connector pair and having means to retain optical signal transmitting elements;
   (d) means for mounting the first and second connectors on the first and second support members, respectively, said support members being relatively movable toward each other to operatively engage the connectors of the first connector pair; and
   (e) means for operatively engaging the connectors of the second connector pair after the connector sections of the first connector are operatively engaged, said engaging means including
      (i) means for mounting the second connector of the second connector pair on the second support member for movement relative to the second support member along a path toward and away from the first connector of the second connector pair when the connectors of the first connector pair are operatively engaged, and
      (ii) rotatable camming means carried by at least one of said support members for moving the second connector of the second connector pair along said path toward the first connector of the second connector pair.

2. An apparatus as defined in claim 1 wherein the first connector pair is an electrical connector pair. connectors of the first connector pair are operatively engaged.

3. An apparatus as defined in claim 1 wherein the means for engaging includes biasing means for urging the second connector of the second connector pair along said path away from the first connector of the second connector pair.

4. An apparatus as defined in claim 1 including means for mounting one of the connectors of the second connector pair of movement relative to the associated support member generally transverse to the path.

5. An apparatus as defined in claim 1 wherein said rotatable camming means includes a screw rotatably carried by said at least one of said support members.

6. An apparatus as defined in claim 1 wherein the connectors of the first and second connector pairs mate along different planes.

7. An apparatus for operatively coupling electrical and optical transmitting elements, said apparatus comprising:
   a mother board and a daughter board
   an electrical connector pair adapted to be coupled to the electrical transmitting elements and an optical connector pair adapted to be coupled to the optical transmitting elements, each of said connector pairs including first and second connectors which can be operatively engaged to couple the associated transmitting elements;
   means for mounting the first and second connectors on the daughter board and the mother board, respectively, the daughter board being movable toward the mother board to operatively engage the connectors of the electrical connector pair;
   means for mounting the second connector of the optical connector pair on the mother board for movement relative to the mother board along a path toward and away from the first connector of the optical connector pair; and
   rotatable camming means for moving the second connector of the optical connector pair along said path to operatively engage the optical connector pair.

8. An apparatus as defined in claim 7 including biasing means for urging the second connector of the optical connector pair along said path away from the first connector of the optical connector pair.

9. An apparatus as defined in claim 7 wherein said rotatable camming means includes a screw rotatably carried by the daughter board.

* * * * *